US010802233B2

(12) United States Patent
Soon et al.

(10) Patent No.: US 10,802,233 B2
(45) Date of Patent: Oct. 13, 2020

(54) COMMUNICATION MODULE HANDLE

(71) Applicant: FINISAR CORPORATION, Sunnyvale, CA (US)

(72) Inventors: Derek Soon, Sunnyvale, CA (US); Tat Ming Teo, Sunnyvale, CA (US); William H. Wang, Sunnyvale, CA (US); Siu Wee Hon, Sunnyvale, CA (US)

(73) Assignee: II-VI Delaware Inc., Wilmington, DE (US)

( * ) Notice: Subject to any disclaimer, the term of this patent is extended or adjusted under 35 U.S.C. 154(b) by 163 days.

(21) Appl. No.: 15/969,567

(22) Filed: May 2, 2018

(65) Prior Publication Data

US 2019/0339467 A1   Nov. 7, 2019

(51) Int. Cl.
| | |
|---|---|
| *G02B 6/00* | (2006.01) |
| *G02B 6/42* | (2006.01) |
| *B25G 1/10* | (2006.01) |
| *B25G 3/38* | (2006.01) |
| *F16C 11/04* | (2006.01) |
| *F16C 11/12* | (2006.01) |
| *B25G 1/02* | (2006.01) |

(52) U.S. Cl.
CPC ........... *G02B 6/4292* (2013.01); *B25G 1/102* (2013.01); *B25G 3/38* (2013.01); *F16C 11/04* (2013.01); *F16C 11/12* (2013.01); *B25G 1/02* (2013.01)

(58) Field of Classification Search
CPC .. G02B 6/3825; G02B 6/3898; G02B 6/4292; G02B 6/00
See application file for complete search history.

(56) References Cited

U.S. PATENT DOCUMENTS

| 6,430,053 B1 * | 8/2002 | Peterson ............ H01R 13/6335 361/728 |
| 10,330,873 B2 * | 6/2019 | Chuang ................ G02B 6/4261 |
| 2014/0169749 A1 | 6/2014 | Yi |

FOREIGN PATENT DOCUMENTS

CN           207301410 U       5/2018

OTHER PUBLICATIONS

International Search Report and Written Opinion dated Jul. 15, 2019, in related PCT Application No. PCT/US2019/030292.

* cited by examiner

*Primary Examiner* — Jennifer Doan
(74) *Attorney, Agent, or Firm* — Maschoff Brennan

(57) ABSTRACT

A communication module handle may include a base, a grasp, a hinge, and a detent. The hinge may connect the base and the grasp. The detent may be configured to maintain a position of the grasp relative to the base in an extended position. In response to the detent being subjected to a detent-releasing force, the detent may release the grasp from the extended position to a collapsed position. The grasp may be rotatable relative to the base by way of the hinge in the collapsed position.

20 Claims, 15 Drawing Sheets

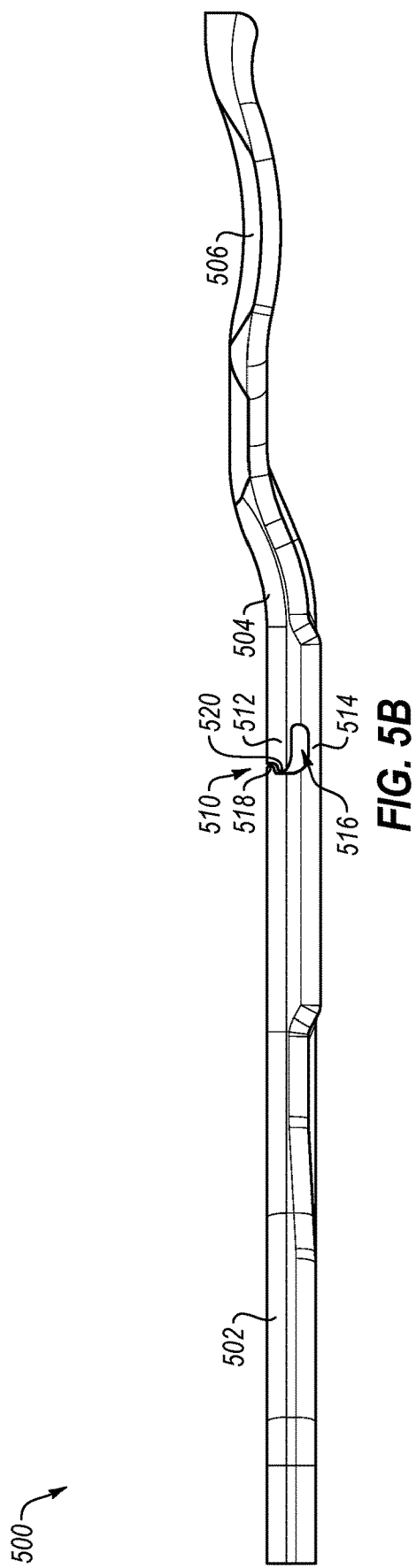

US 10,802,233 B2

COMMUNICATION MODULE HANDLE

BACKGROUND

The present disclosure generally relates to handles for communication modules.

Some communication modules, such as optoelectronic communications modules may include handles. In some instances, the handles may be described as pull tabs. The handles may facilitate physical manipulation of the communication modules. For example, the handles may facilitate insertion of the communication modules into host devices. Similarly, the handles may facilitate removal of the communication modules from host devices. While coupled with the host devices, the communication modules may facilitate communication between host devices.

The claimed subject matter is not limited to embodiments that solve any disadvantages or that operate only in environments such as those described above. This background is only provided to illustrate examples of where the present disclosure may be utilized.

SUMMARY

In some embodiments, a communication module handle may include a base, a grasp, a hinge, and a detent. The hinge may connect the base and the grasp. The detent may be configured to maintain a position of the grasp relative to the base in an extended position. In response to the detent being subjected to a detent-releasing force, the detent may release the grasp from the extended position to a collapsed position. The grasp may be rotatable relative to the base by way of the hinge in the collapsed position.

In further embodiments, the hinge may include a pin located at least partially within a first opening defined in the base and a second opening defined in the grasp.

In additional embodiments, the hinge may include a flexible connector.

In other embodiments, the base may include a member and the grasp may include an extension positioned adjacent to the member. Optionally, the detent may include a recess defined in the member and a protrusion defined on the extension. The protrusion may be configured to be located at least partially within the recess of the member while the grasp is in the extended position relative to the base.

In some further embodiments, the base may define a recess and the grasp may define an extension configured to be located at least partially within the recess of the base while the grasp is in the extended position relative to the base. Optionally, the detent may include an opening defined in the base and a protrusion located on the extension. The protrusion may be configured to be located, at least partially, within the opening while the grasp is in the extended position relative to the base. In some configurations, the protrusion may include a flange configured to be positioned, at least partially, within a rabbet defined in the base adjacent the opening while the grasp is in the extended position relative to the base. In some instances, the protrusion may define a channel in the protrusion.

In some additional embodiments, the base may define an opening through a width of the base. The opening may be open on a side of the base adjacent the grasp. The grasp may include an extension configured to be located, at least partially, within the opening while the grasp is in the extended position relative to the base. Optionally, the extension may include a protrusion and the base may define a recess adjacent to the opening. The protrusion may be configured to be located, at least partially, within the recess while the grasp is in the extended position relative to the base.

In some other embodiments, the base may define a recess and the grasp may include an extension having a protrusion configured to be located at least partially within the recess of the base while the grasp is in the extended position relative to the base.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims.

BRIEF DESCRIPTION OF THE DRAWINGS

FIG. 5B illustrates a side view of the example handle of FIG. 5A in the extended position.

DETAILED DESCRIPTION

Conventional communication module handles may be damaged during use. For example, a user may bend a conventional handle with enough force to damage the handle. For instance, the handle may be bent and damaged as the communication module is inserted into a host device or as the communication module is removed from the host device.

Furthermore, in some instances, a configuration of the host device and/or nearby objects may encourage conventional handles to bend and potentially damage the conventional handles. For instance, a host device may be located behind a door or other movable object. In some configurations, the door or movable object may be positioned such that conventional handles are not provided adequate clearance and may be bent and potentially damaged when the door is shut or the movable object is moved into place. In some instances, conventional communication module handles may obstruct the movement of the door or moveable object. For example, the handles may prevent a door providing access to the host device from being closed or from being closed without bending the handles. In some configurations, forces that cause the handles to bend may be transferred to the communication module, the communication module-host interface, and/or to the host, which may potentially cause damage or affect performance of the communication module.

Some conventional communication modules may include handles made from a flexible material, such as Santoprene. However, forming the handle from flexible materials may lead to difficulties when inserting a communication module into a host device using the flexible handle. For instance, a user may resort to handling a communication module by a body of the communication module rather than the flexible handle of the communication module. Some conventional communication modules may employ a wedge feature for prying open a cage of the host module to extract the communication module. Other communication modules may employ a latch that retracts into the communication module on activation of the communication module. Still other communication modules may employ a fork-like device for prying open a securing spring latch to extract the communication module.

Reference will now be made to the figures wherein like structures will be provided with like reference designations. The drawings are non-limiting, diagrammatic, and schematic representations of example embodiments, and are not necessarily drawn to scale.

Figure 1:
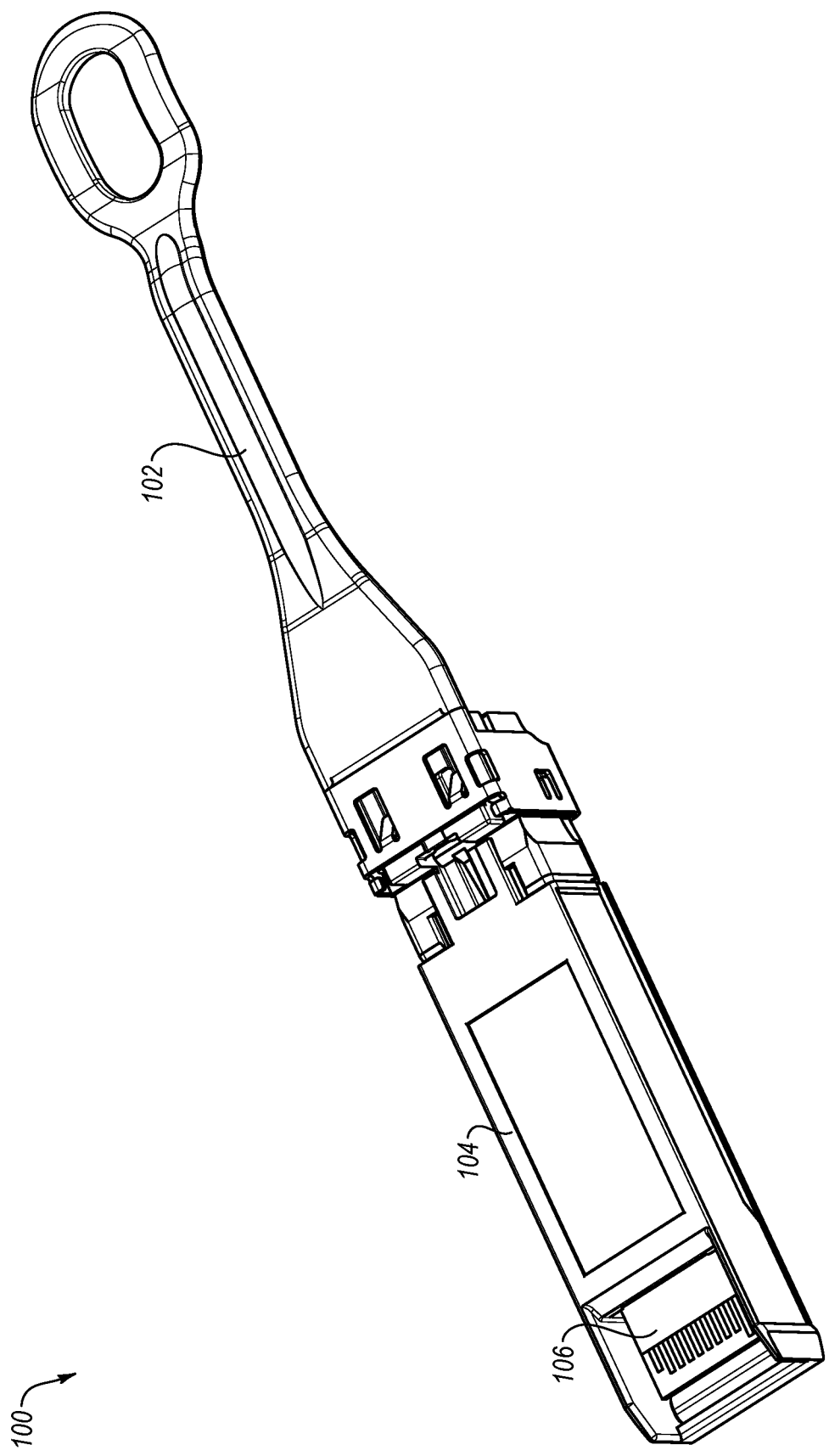
FIG. 1 illustrates a perspective view of an example communication module.

FIG. 1 illustrates a perspective view of an example communication module 100 including a handle 102. The communication module 100 includes a body 104 that may be inserted into or removed from a host device using the handle 102 as a grip for physically manipulating the communication module 100. A connector 106 may interface with a counterpart connector of the host device such that the communication module 100 and the host device can communicate via electronic signaling. The communication module 100 may include an optoelectronic communication module. Particularly, the communication module 100 may include a small form-factor pluggable (SFP) module, an SFP+ module, an active optical cable (AOC) module, a Quad Small Form-factor Pluggable (QSFP) module, a CXP module, or the like. Alternatively, the communication module 100 may include other optoelectronic module form factors or other communication module types.

Figure 2A:
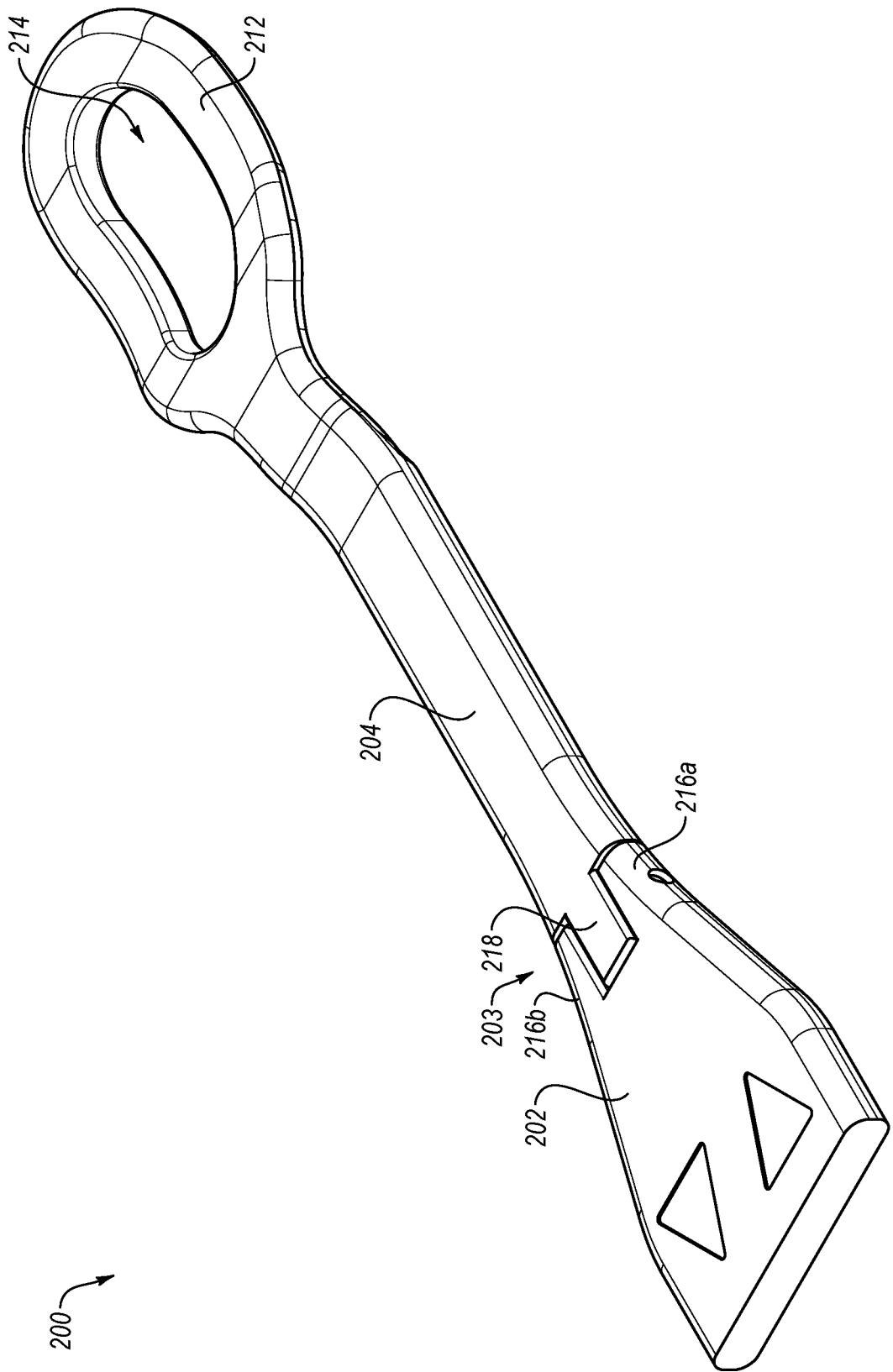
FIG. 2A illustrates a perspective view of an example handle in an extended position.
Figure 2B:
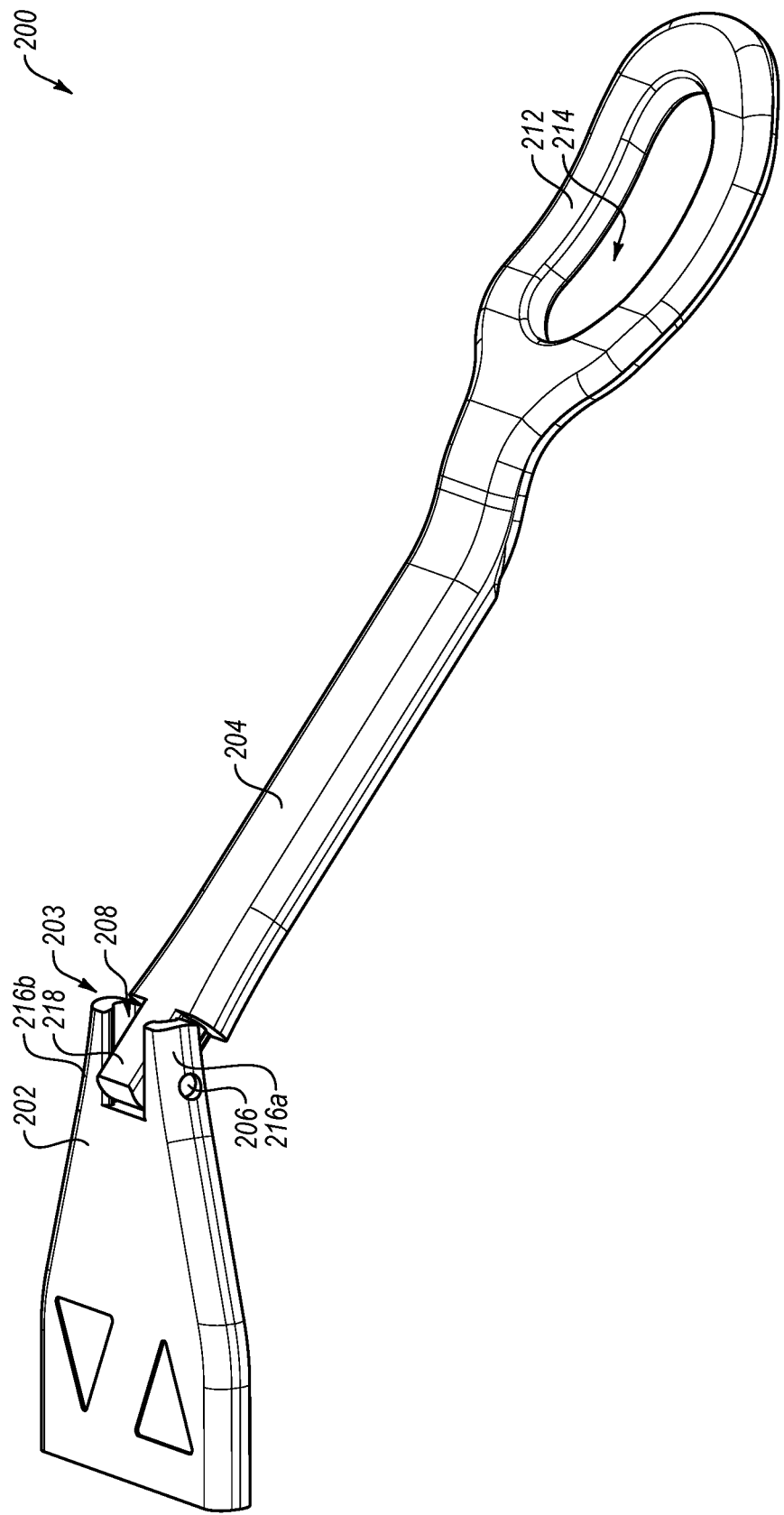
FIG. 2B illustrates a perspective view of the example handle of FIG. 2A in a collapsed position.
Figure 2C:
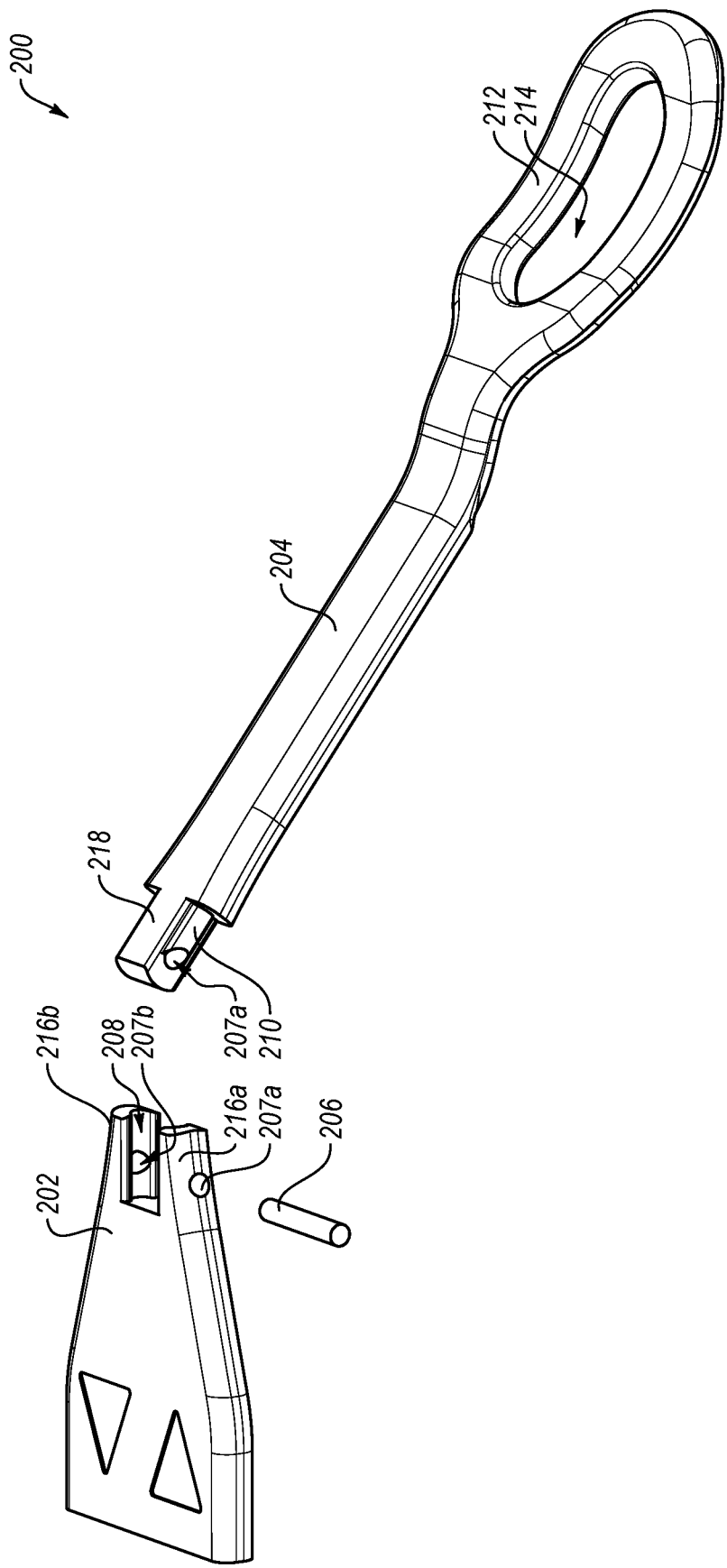
FIG. 2C illustrates an exploded view of the example handle of FIG. 2A.

FIGS. 2A-2C illustrate various views of an example handle 200. The handle 200 may generally correspond to the handle 102 of FIG. 1. That is, the handle 200 may be attached to a body of a communication module, such as the body 104 of the communication module 100 of FIG. 1. The handle 200 may be adapted for various communication module types. For instance, the handle 200 may be shaped to fit on and to function with a variety of communication modules, including a variety of optoelectronic communication modules, such as but not limited to, SFP, SFP+, AOC, QSFP, and CXP modules.

The handle 200 may facilitate deformation of the handle 200 in a manner that does not damage the handle 200. Thus, for example, the handle 200 may be selectively deformed in a manner that would damage conventional handles, which may allow the handle 200 to resist damage during insertion and/or removal operations. Furthermore, the handle 200 may facilitate the use of communication modules in environments and/or physical configurations that may damage conventional modules.

The handle 200 includes a base 202. The handle 200 may attach to a communication module at the base 202. For example, the base 202 may be molded to an appropriate feature of a body of a communication module.

The handle 200 further includes a grasp 204. The grasp 204 may optionally include a grip 212, which may facilitate handling during insertion and removal of an associated communication module relative to a host device. The grip 212 may optionally define an opening 214, which may further facilitate handling, may reduce the amount of material used in the handle 200, or the like.

The grasp 204 is attached to the base 202 via a hinge 203. The hinge 203 facilitates movement of the grasp 204 relative to the base 202. In some embodiments, the hinge 203 may restrict the movement of the grasp 204 to rotation about an axis. Thus, for example, the handle 200 may be deformed relative to an extended position (e.g., the position illustrated in FIG. 2A, described herein as an extended position), which may generally facilitates insertion and removal of an associated communication module in a manner that resists damage to the handle 200. In this and other embodiments, the extended position may be associated with a handle configuration in which the base and the grasp are aligned. Furthermore, handle configurations in which the base and the grasp are not aligned may be described generally as a collapsed position.

In some embodiments, the hinge 203 may include a pin 206 positioned in defined opening 207a, opening 207b, and opening 207c (collectively, openings 207) such that the grasp 204 may rotate relative to an axis of the pin 206. Thus, for example, the grasp 204 may rotate relative to the base 202. The base 202 may include member 216a and member 216b configured to be located on opposite sides of an extension 218 located on the grasp 204. The openings 207 may be defined in the members 216 and the extension 218 such that the pin 206 may hold the base 202 and the grasp 204 together while facilitating rotation of the grasp 204 relative to the base 202.

Additionally, the hinge 203 may include a detent such that the handle 200 may be encouraged to remain in the extended position until a sufficient force overcomes the resistance provided by the detent and the grasp 204 moves relative to the base 202. For example, the grasp 204 and base 202 may be in a position that generally facilitates the grasp 204 moving relative to the base 202 (e.g., the position illustrated in FIG. 2B, which, with all other non-extended positions, is described herein as the collapsed position).

In this and other embodiments, a force sufficient to overcome the resistance provided by the detent may be described as a detent-releasing force. The detent-releasing force may include forces having a force component in a direction perpendicular to a plane generally corresponding to a general plane of the base 202 or bases of other embodiments. Additionally, the detent-releasing force may include forces in line with the lengthwise direction of the handle 200 and handles of other embodiments. For instance, detent-releasing forces may include inline forces that might otherwise encourage the handle 200 to buckle. In some instances, forces suitable for inserting a communication module with little or no chance of damaging an associated handle may not be detent-releasing forces. By way of example, the detent may be configured such that an insertion force sufficient to cause an equivalent conventional unhinged handle to buckle or otherwise bend in a manner that may damage the conventional unhinged handle may cause the detent to release the grasp 204 relative to the base 202.

In some embodiments the detent may include one or more recesses 208 and one or more protrusions 210 that may be positioned at least partially within the recesses 208 when the handle 200 is in the extended position. By way of example, the grasp 204 may include two protrusions 210 located on each side of the extension 218 adjacent to the members 216. The members 216 may define the recesses 208 adjacent the extension 218 such that each of the protrusions 210 is located at least partially within one of the respective recesses 208 while the handle 200 is in the extended position. The detent may alternately or additional include one or more recesses 208 and one or more protrusions 210 on other adjacent surfaces, such as a front of the extension 218 and a portion of the base 202 located between the members 216. Alternately or additionally, the recesses 208 and the protrusions 210 may have different shapes, their positions may be swapped, or the like or any combination thereof. The protrusions 210 located in the recesses 208 may encourage the grasp 204 to maintain an extended position relative to the base 202 until a detent-releasing force encourages the protrusions 210 to exit the recesses 208.

In some configurations, the detent may employ elastic deformation of its components to function. For instance, the material defining the recesses 208 and the protrusions 210 may elastically deform. Alternately or additionally, the members 216 may elastically flex and/or the extension 218 may elastically compress. In some embodiments, the pin 206 may have a length that resists the members 216 slipping off the pin 206 should the members 216 flex away from one another as the detent is disengaged. In some embodiments, other detent configurations may be employed.

In some embodiments, the detent-releasing force may overcome a holding force of the detent such that the handle 200 leaves the extended position and enters a collapsed position. In some configurations, the grasp 204 may rotate relative to the pin 206 and the base 202 in either direction. That is, the handle 200 may be described as collapsing in either direction. For example, the handle 200 may collapse in a direction opposite relative to the collapse direction shown in FIG. 2B. Alternatively, the hinge 203 may include a stop or the like to restrict rotation to one direction. Alternately or additionally, the hinge 203 may include a stop or the like to restrict the range through which the grasp 204 can rotate.

While the handle 200 is in an extended position, the detent may be in a position described herein as a holding position. While the handle 200 is in a collapsed position, the detent may be in a position described herein as a released position. In this and other embodiments, the detent may generate some resistance as the handle goes from the collapsed position to the extended position. In this and other embodiments, the detent may generate tactile and/or audible feedback when the detent goes from its released position to its holding position and from its holding position to its released position. In this and other embodiments, the detent may facilitate the grasp 204 being returned to the extended position relative to the base 202 from the collapsed position.

Figure 3A:
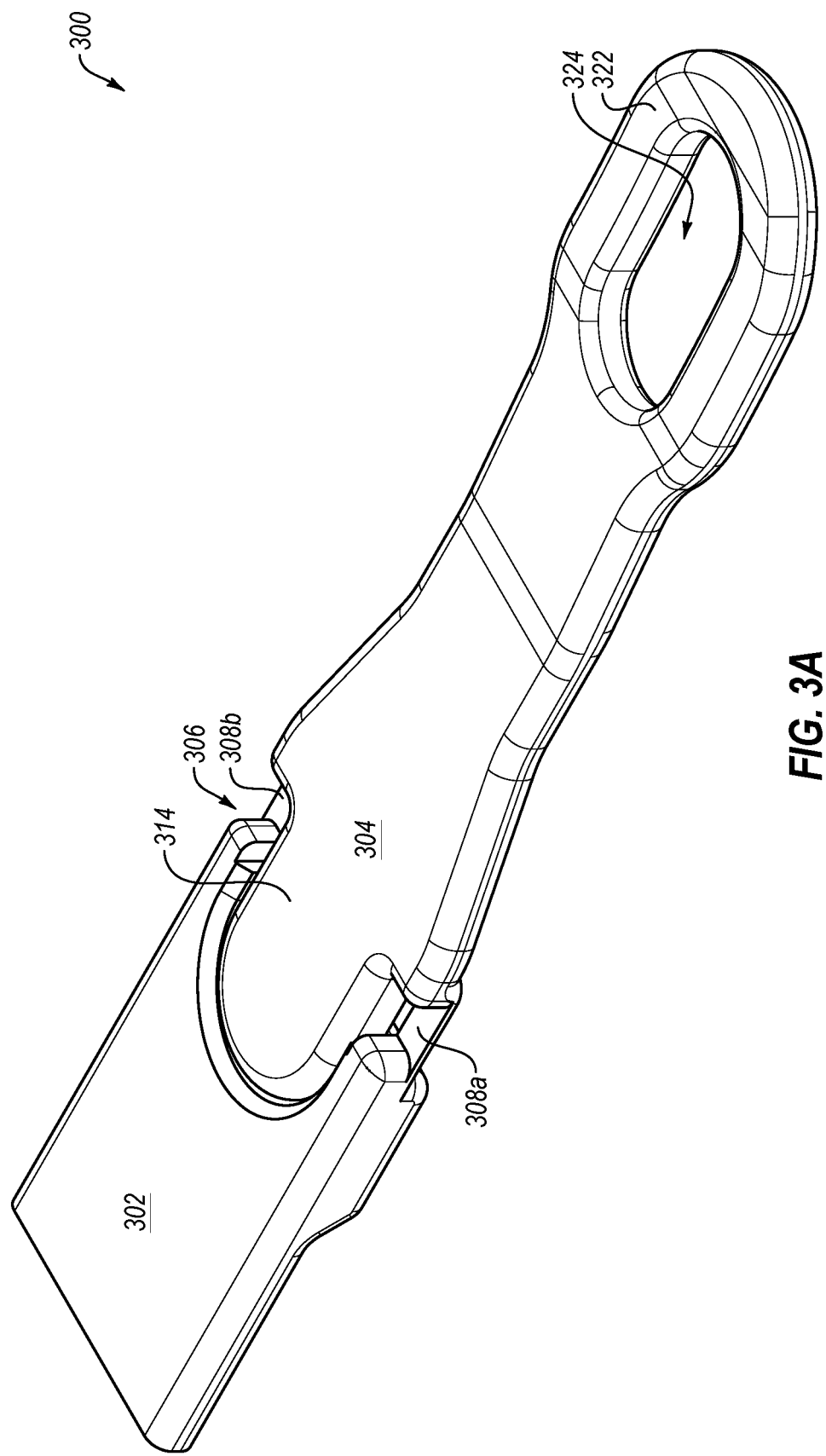
FIG. 3A illustrates a perspective view of another example handle in an extended position.
Figure 3B:
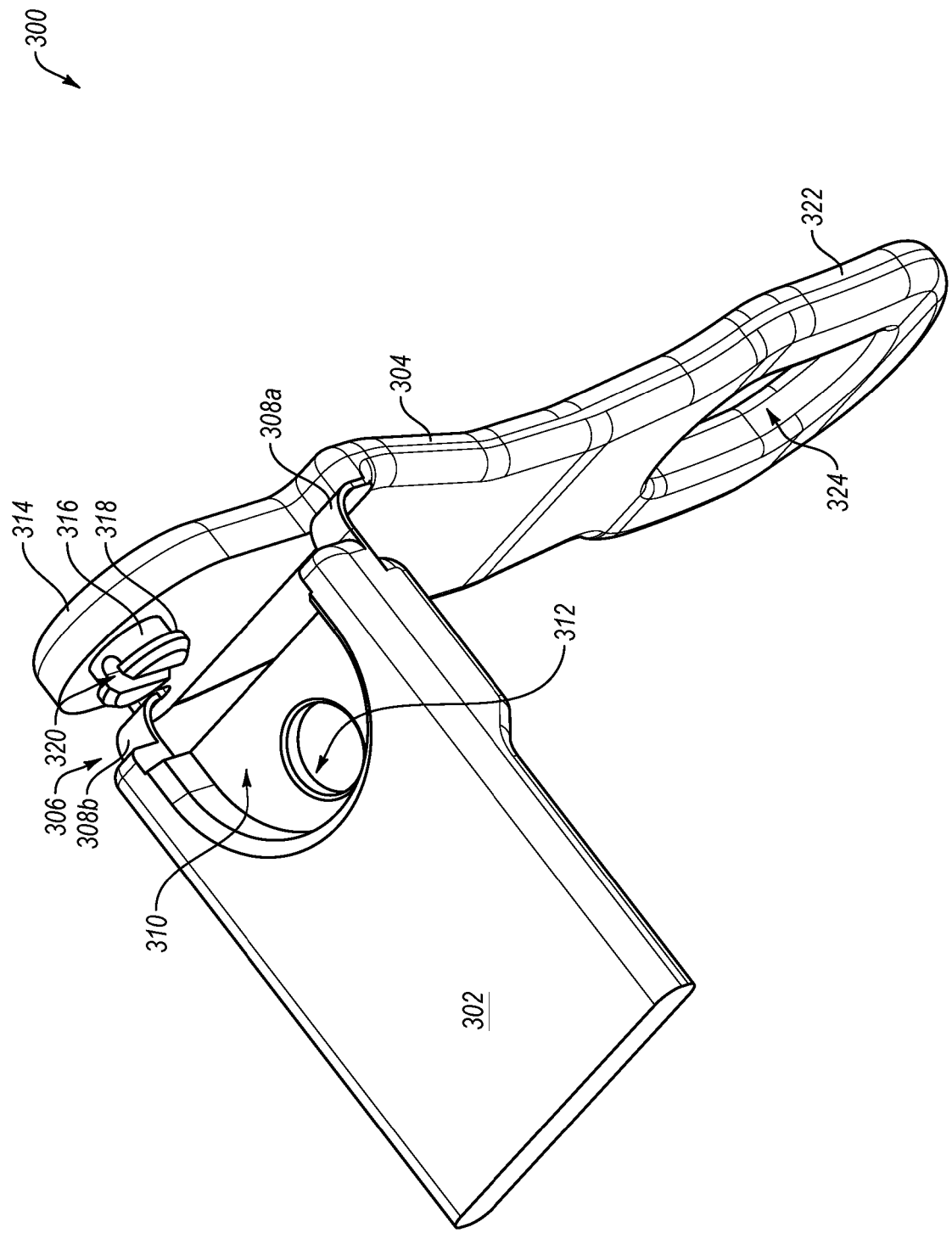
FIG. 3B illustrates a top perspective view of the example handle of FIG. 3A in a collapsed position.
Figure 3C:
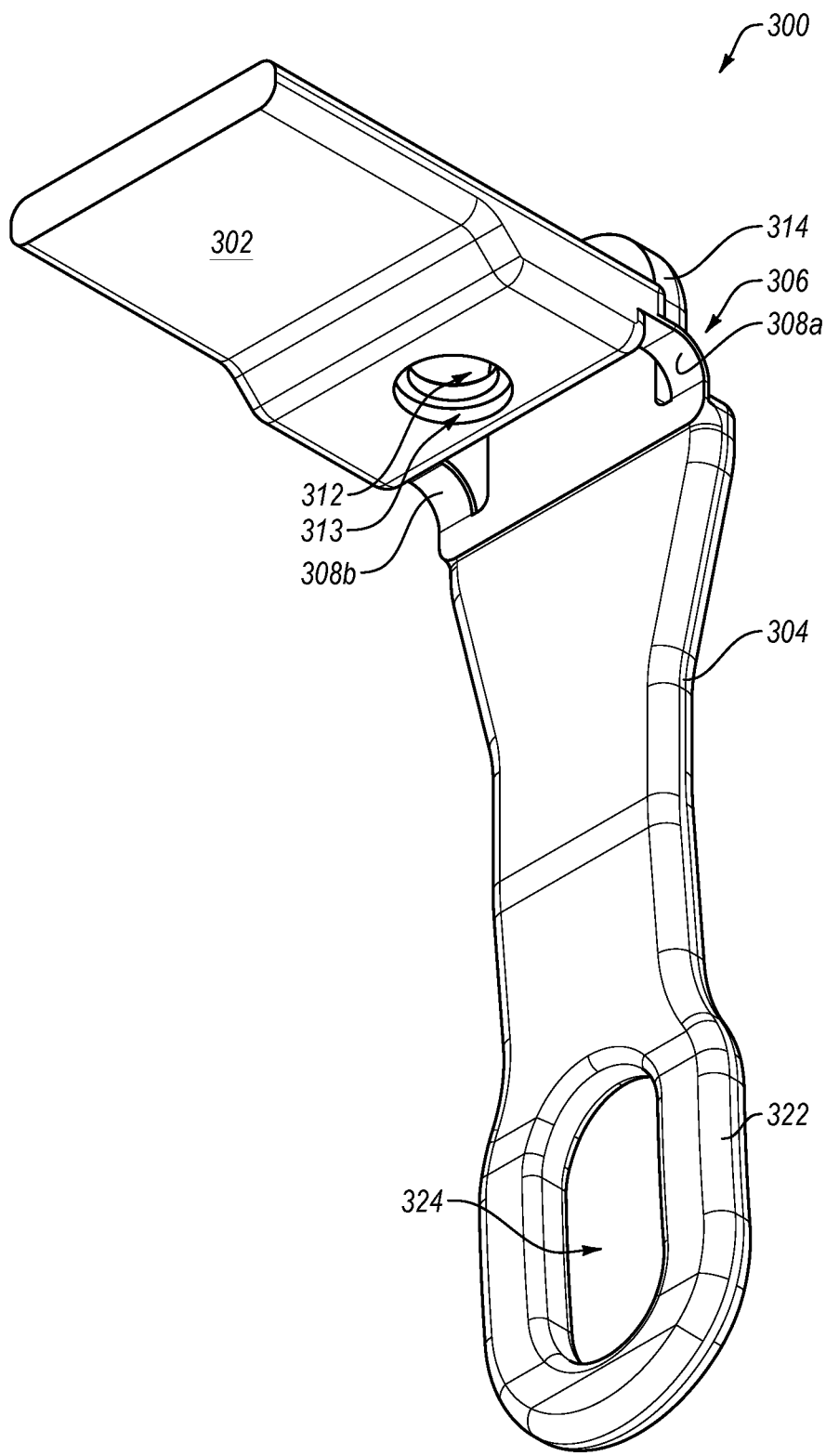
FIG. 3C illustrates a bottom perspective view of the example handle of FIG. 3A in the collapsed position.
Figure 4A:
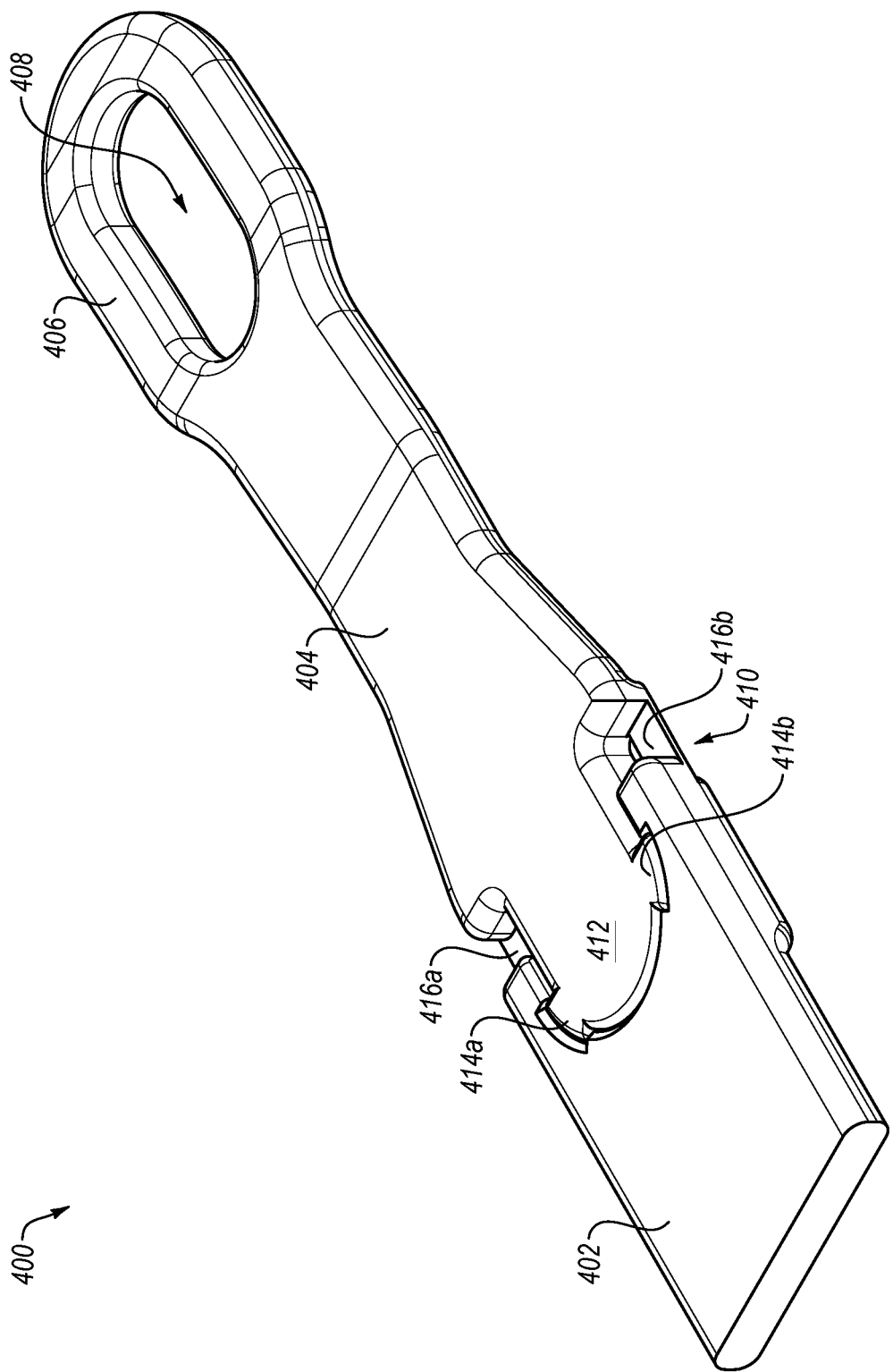
FIG. 4A illustrates a top perspective view of still another example handle in an extended position.
Figure 4B:
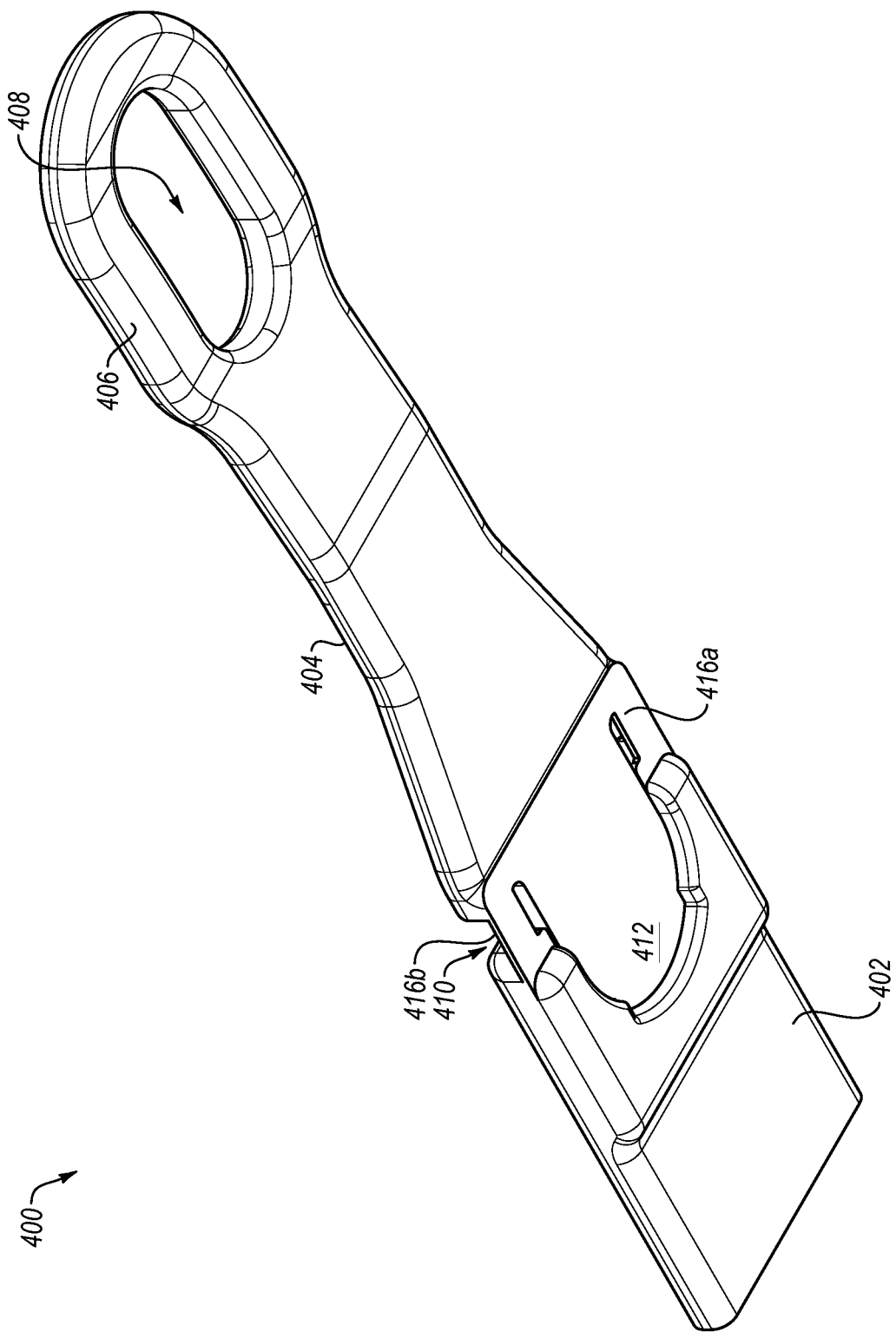
FIG. 4B illustrates a bottom perspective view of the example handle of FIG. 4A in the extended position.
Figure 4C:
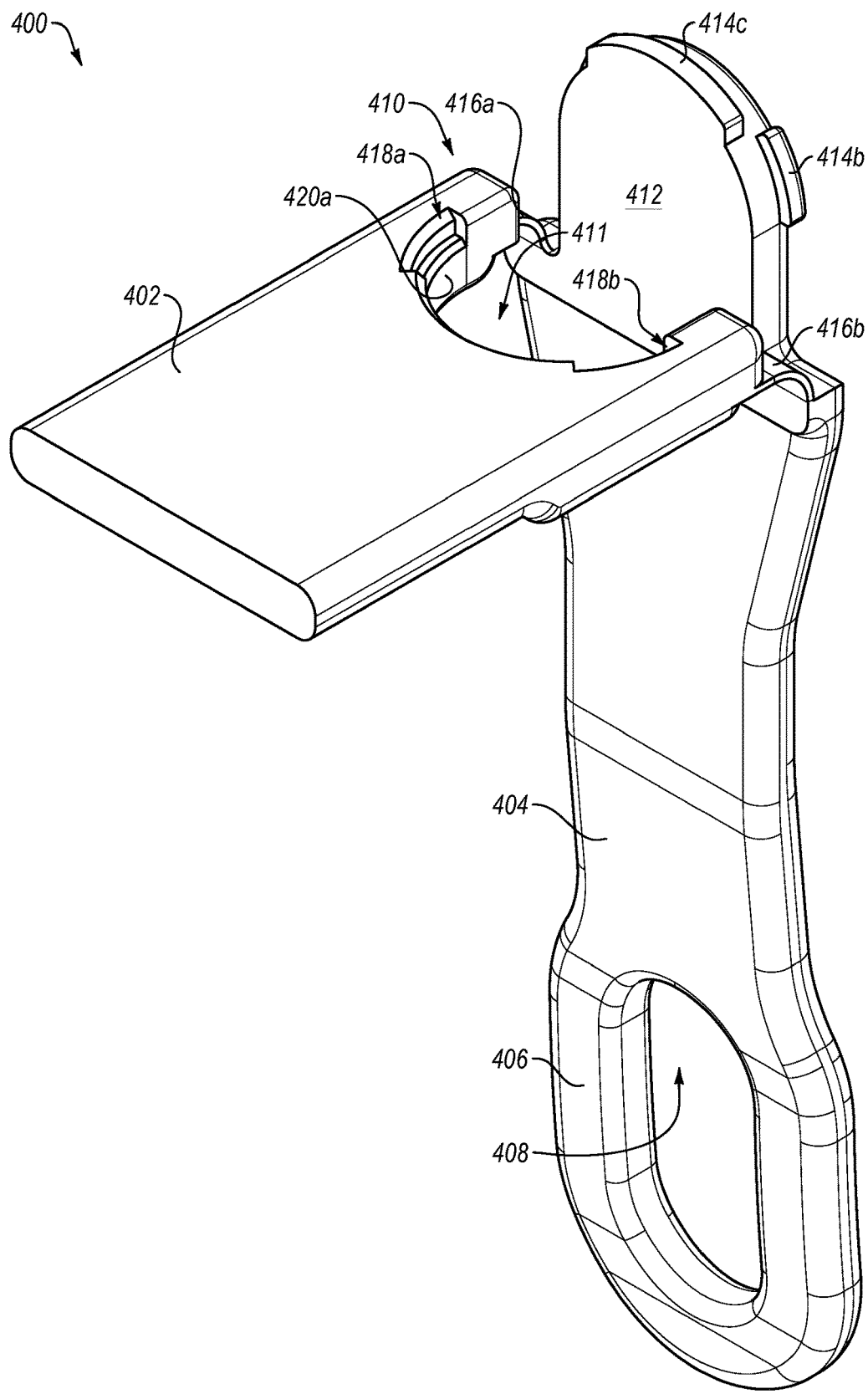
FIGS. 4C-4E illustrate perspective views of the example handle of FIG. 4A in a collapsed position.
Figure 4D:
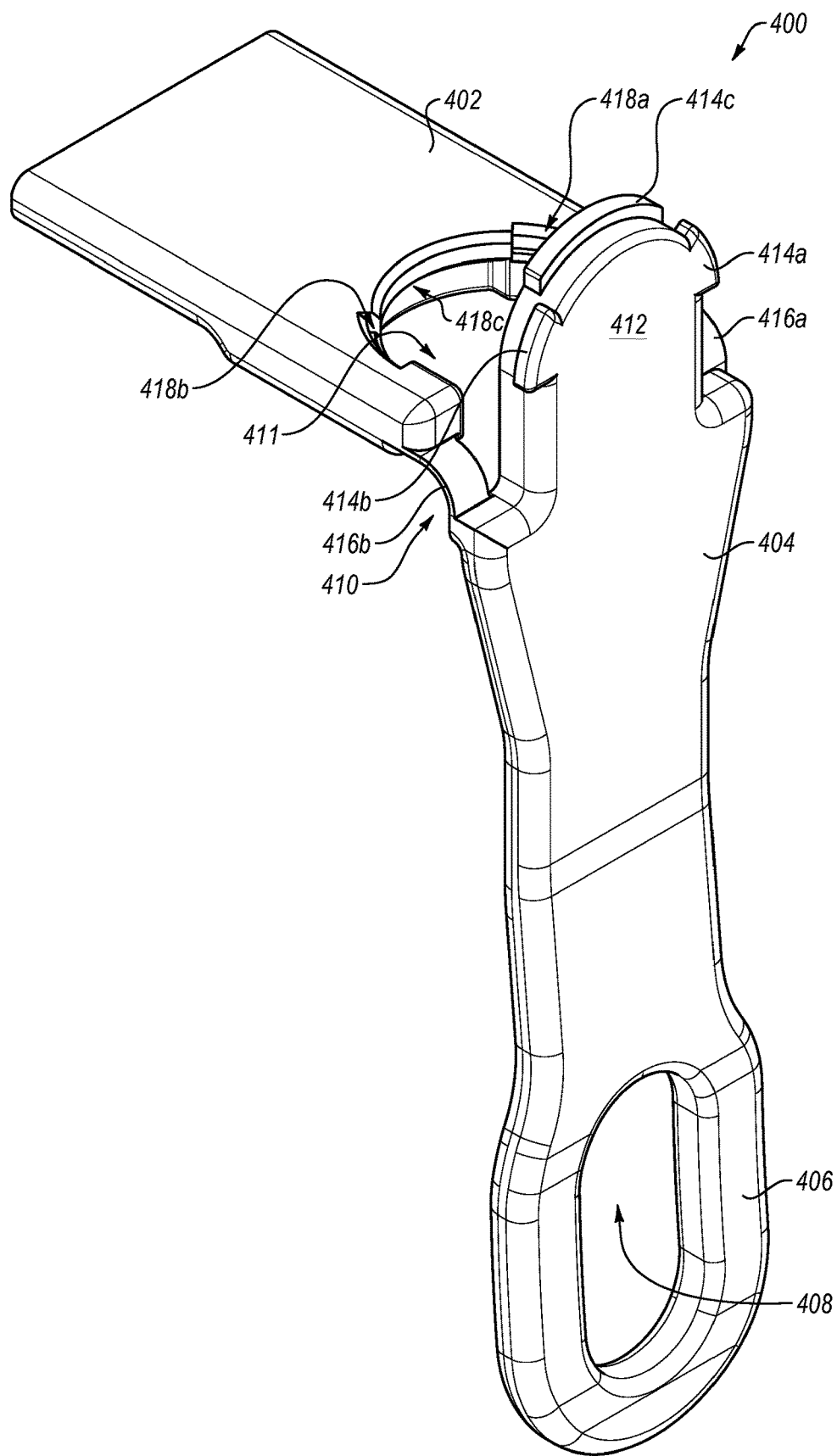
Figure 4E:
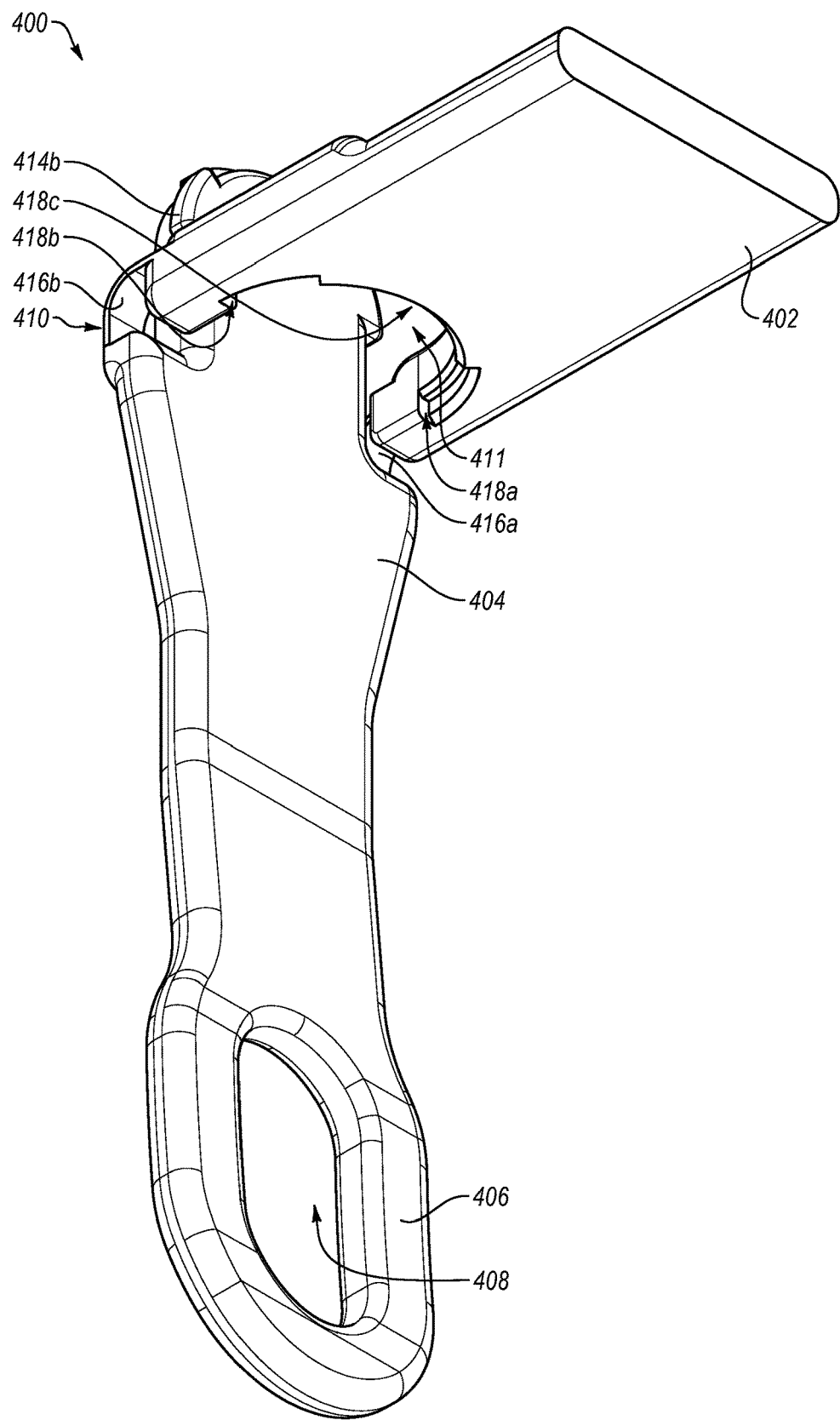

FIGS. 3A-3C illustrate various views of an example handle 300. The handle 300 may generally correspond to the handle 102 of FIG. 1 and the handle 200 of FIGS. 2A-2C. The handle 300 may be attached to a body of a communication module and may be adapted for various communication module types.

The handle 300 may include a base 302, a grasp 304, a grip 322, and an opening 324 generally corresponding, respectively, to the base 202, the grasp 204, the grip 212, and the opening 214 of the handle 200 of FIGS. 2A-2C. The handle 300 may also include a hinge 306, which may generally correspond to the hinge 203 of FIGS. 2A-2C.

In particular, the hinge 306 may include a flexible connector 308a and a flexible connector 308b (collectively, flexible connectors 308). The flexible connectors 308 may flexibly connect the base 302 and the grasp 304. In some embodiments, the flexibility of the flexible connectors 308 may result from the materials used in the flexible connectors 308 and/or from the size and shape of the flexible connectors 308. For example, the flexible connectors 308 may be relatively thin along a dimension that bends to facilitate movement of the grasp 304 relative to the base 302. For instance, the flexible connectors 308 may have ribbon-like shapes that facilitate bending relative to the smallest dimensions of the flexible connectors 308.

The flexible connectors 308 may facilitate the grasp 304 rotating relative to the base 302. The handle 300 is configured such that the grasp 304 may rotate relative to the base 302 in one direction. For example, the grasp 304 may enter a collapsed position in the direction illustrated in FIGS. 3B and 3C. The configuration of the handle 300 may discourage the grasp 304 from entering a collapsed position in the other direction.

The base 302 defines a recess 310. The grasp 304 includes an extension 314 that may be positioned in the recess 310 of the base 302. The extension 314 may be positioned outside of the recess 310 while the handle 300 is in the collapsed position. As illustrated, the configuration of the recess 310 may resist rotation of the grasp 304 in one direction, while facilitating rotation in the other direction.

The handle 300 may include a detent generally corresponding to the detent of the handle 200 of FIGS. 2A-2C. For instance, the detent of the handle 300 may encourage the handle 300 to maintain an extended position (e.g., the position illustrated in FIG. 3A) until a detent-releasing force disengages the detent and the handle 300 enters a collapsed position (e.g., the position illustrated in FIGS. 3B and 3C).

The detent may include a protrusion 316 and a corresponding opening 312 defined in the base 302. As may be seen in FIG. 2B, the opening 312 may be defined in a bottom surface of the base 302. The protrusion 316 may extend from a bottom surface of the extension 314, such that the protrusion 316 enters the opening 312 when the handle 300 transitions from the collapsed position to the extended position.

The protrusion 316 may include a flange 318 and a channel 320. The flange 318 may be positioned such that the flange 318 is positioned in a corresponding rabbet 313 in the base 302, which may form part of the opening 312, while the handle 300 is in the extended position. Accordingly, the flange 318 and the rabbet 313 may encourage the handle 300 to maintain the extended position until subjected to a detent-releasing force.

In some embodiments, the protrusion 316 may include a channel 320. The channel 320 may facilitate bending of the protrusion 316 on either side of the channel 320. For instance, the channel 320 may facilitate elastic deformation of the protrusion 316 such that the flange 318 may be inserted into the opening 312 as the handle 300 moves from the collapsed position to the extended position or removed from the opening 312 as the handle 300 moves from the extended position to the collapsed position. In some configurations, the grasp 304, protrusion 316, base 302, and/or the flange 318 may include materials that facilitate elastic deformation.

Thus, for example, the handle 300 may maintain its extended position throughout insertion and removal actions of a corresponding communication module until the handle is subjected to a detent-releasing force. Upon being subjected to such a force, the protrusion 316 may exit the opening 312 and the grasp 304 may rotate relative to the base 302. By way of example, a force sufficient to cause a conventional handle to buckle or bend to a point of potential damage may be sufficient to cause the detent of the handle 300 to disengage.

FIGS. 4A-4E illustrate various views of an example handle 400. The handle 400 may generally correspond to the handle 102 of FIG. 1, the handle 200 of FIGS. 2A-2C, and the handle 300 of FIGS. 3A-3C. The handle 400 includes a base 402 generally corresponding to the base 202 of the handle 200 and to the base 302 of the handle 300. The handle further includes a grasp 404 generally corresponding to the grasp 204 of the handle 200 and the grasp 304 of the handle 300. The handle 400 may further include a grip 406 and an opening 408 generally corresponding, respectively, to the grip 212 and the opening 214 of the handle 200 and to the grip 322 and the opening 324 of the handle 300.

The handle 400 includes a hinge 410 that may generally correspond to the hinge 203 of the handle 200 and to the hinge 306 of the handle 300. The hinge 410 may include a flexible connector 416a and a flexible connector 416b (collectively, flexible connectors 416), which may correspond generally to the flexible connectors 308 of the handle 300.

The hinge 410 may facilitate the grasp 404 rotating relative to the base 402. For instance, the grasp 404 may rotate from an extended position (e.g., the position illustrated in FIG. 4A) in two directions to take on the collapsed position (e.g., the positions illustrated in FIGS. 4C-4E). The two directions in which the handle 400 may collapse are described herein as up and down.

The base 402 may define an opening 411. The opening 411 may be open on a side of the base 402 adjacent the grasp 404. Furthermore, the opening 411 may be defined through a width of the base 402 to accommodate the grasp 404 entering the collapsed positions in the two directions. The grasp 404 may include an extension 412 that is located, at least in part, in the opening 411 while the handle 400 is in the extended position.

In some embodiments, the handle 400 may include a detent generally corresponding to the detent of the handle 200 and the detent of the handle 300. The detent of the handle 400 may include a protrusion 414a, a protrusion 414b, and a protrusion 414c (collectively, protrusions 414), and a recess 418a, a recess 418b, and a recess 418c (collectively, recesses 418). The protrusions 414 may be located on the extension 412 and the recesses 418 may be defined in the base 402 adjacent to the opening 411. Alternately, one or more of the protrusions 414 may be located on the base 402 adjacent to the opening 411 and one or more of the corresponding recesses 418 may be defined in the extension 412. Each of the protrusions 414 may be sized and shaped to be positioned at least partially within one of the corresponding recesses 418 when the handle 400 is in the extended position. In some configurations, the handle 400 may include more or fewer protrusions 414 and recesses 418.

The protrusions 414 and the corresponding recesses 418 may be staggered in a manner that may facilitate the detent encouraging the handle 400 to maintain the extended position while facilitating the detent to release the handle 400 to collapse up or down. For example, the protrusion 414a and the protrusion 414b, with the recess 418a and the recess 418b may be positioned to resist the handle 400 from entering the collapsed position in a first direction, described as the up direction. Furthermore, the protrusion 414b and the recess 418b may be positioned to resist the handle 400 from entering the collapsed position in a second direction, described as the down direction. Thus, for example, a detent-releasing force sufficient to encourage the protrusion 414a and the protrusion 414c to traverse the base 402 and exit, respectively, the recess 418a and the recess 418c may disengage the detent and encourage the handle 400 to enter the collapsed position in the up direction. Similarly, a force sufficient to cause the protrusion 414b to traverse the base 402 and exit the recess 418b may disengage the detent and encourage the handle 400 to enter the collapsed position in the down direction.

In some embodiments, the protrusions 414 and the recesses 418 may be numbered and/or sized to prompt a same or similar degree of force to encourage the handle 400 to enter the collapsed position in either direction. Alternately, the protrusions 414 and the recesses 418 may be numbered and/or sized to encourage the handle 400 to collapse relatively more easily in one direction relative to the other direction. For instance, the protrusions 414 and the recesses 418 may be configured such that the handle 400 may collapse in the down direction relatively more easily than the up direction. As may be seen, the protrusion 414b may be relatively larger than the protrusion 414a and the protrusion 414c, while the protrusion 414a and the protrusion 414c may outnumber the protrusion 414b.

By way of example, the protrusion 414c and the corresponding recess 418c may be located in a bottom position. The protrusion 414a and the corresponding recess 418a, as well as the protrusion 414b and the corresponding recess 418b may be located in an upper position. Thus, for example, the handle 400 may maintain its extended position throughout insertion and removal actions of a corresponding communication module until the handle is subjected to a detent-releasing force. Upon being subjected to such a force, the protrusions 414 may exit the recesses 418 and the grasp 404 may rotate relative to the base 402. Depending on the direction the grasp 404 rotates relative to the base 402, some of the protrusions 414 may traverse the base 402. For example, the protrusion 414a and the protrusion 414b may traverse the base 402 as the grasp 404 rotates to the collapsed position in the down direction. Alternatively, the protrusion 414c may traverse the base 402 as the grasp 404 rotates to the collapsed position in the up direction.

Figure 5A:
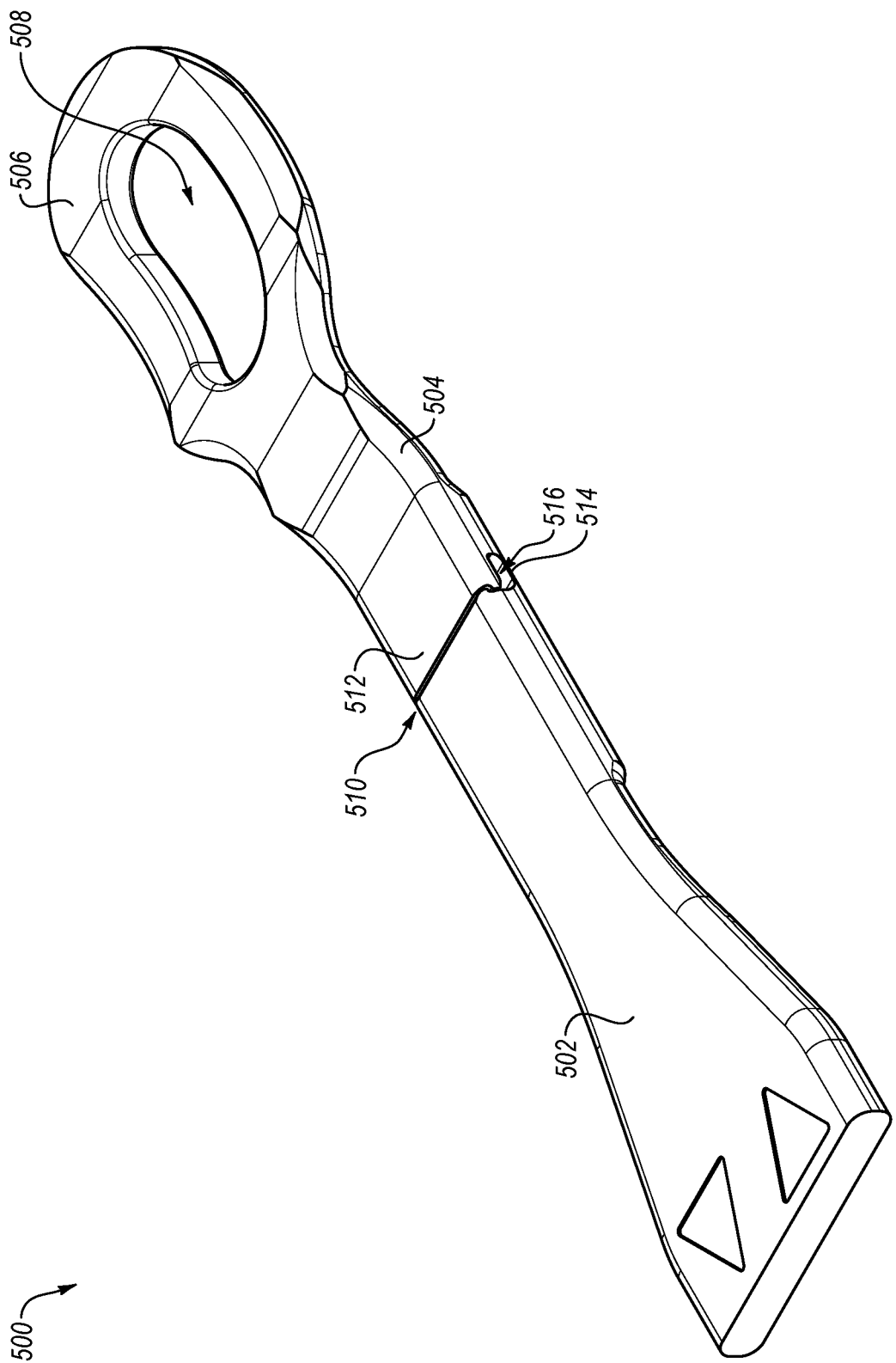
FIG. 5A illustrates a perspective view of yet another example handle in an extended position.
Figure 5C:
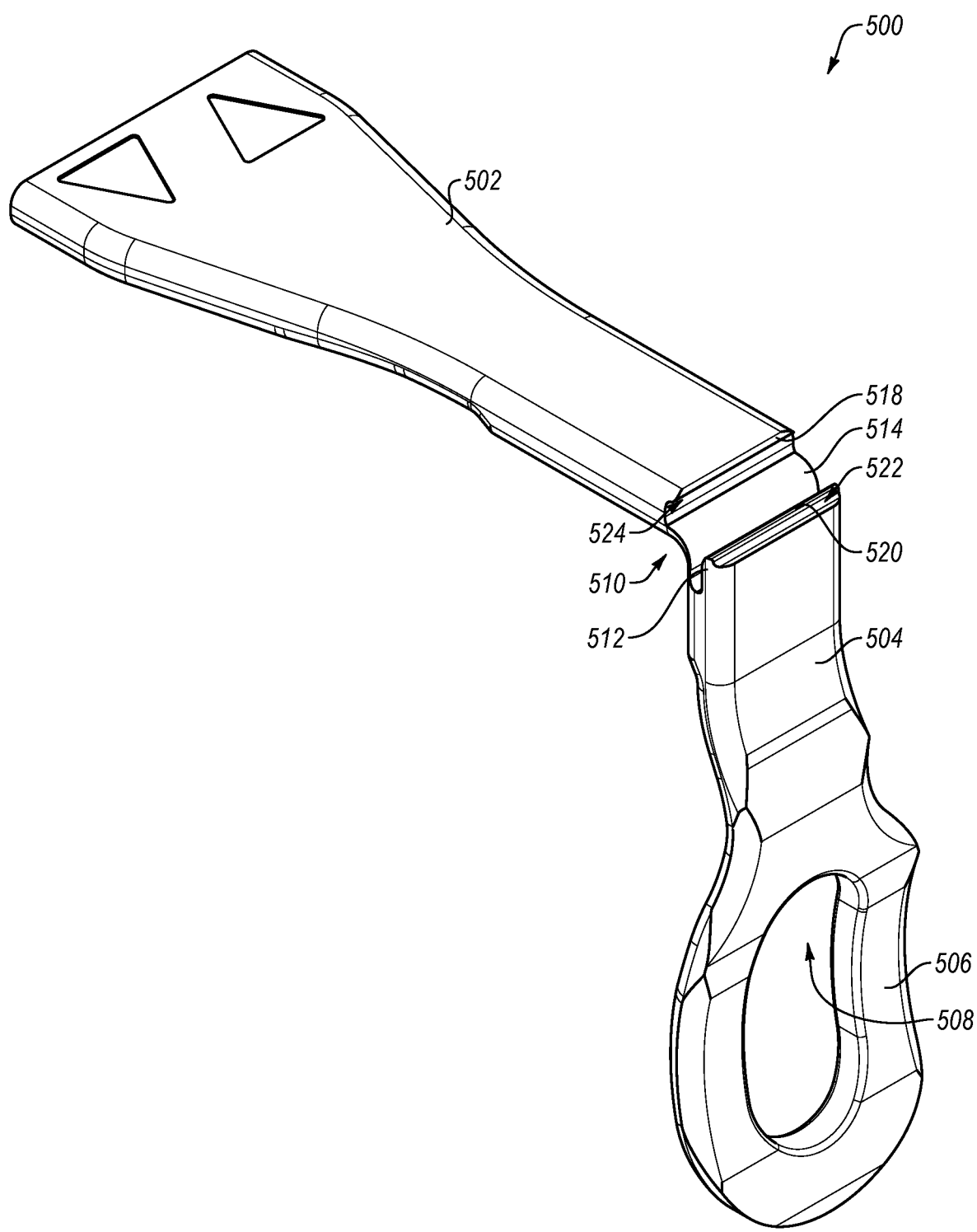
FIG. 5C illustrates a perspective view of the example handle of FIG. 5A in a collapsed position.

FIGS. 5A-5C illustrate various views of an example handle 500. The handle 500 may generally correspond to the handle 102 of FIG. 1, the handle 200 of FIGS. 2A-2C, the handle 300 of FIGS. 3A-3C, and the handle 400 of FIGS. 4A-4E. The handle 500 includes a base 502 generally corresponding to the base 202 of the handle 200, the base 302 of the handle 300, and the base 402 of the handle 400. The handle 500 further includes a grasp 504 generally corresponding to the grasp 204 of the handle 200, the grasp 304 of the handle 300, and the grasp 404 of the handle 400. The handle 500 may further include a grip 506 and an opening 508 generally corresponding, respectively, to the grip 212 and the opening 214 of the handle 200, to the grip 322 and the opening 324 of the handle 300, and to the grip 406 and the opening 408 of the handle 400.

The handle 500 includes a hinge 510 that may generally correspond to the hinge 203 of the handle 200, the hinge 306 of the handle 300, and the hinge 410 of the handle 400. The hinge 410 may include a flexible connector 514, which may correspond generally to the flexible connectors 308 of the handle 300 and the flexible connectors 416 of the handle 400. The hinge 510 may facilitate the grasp 504 rotating relative to the base 502. For instance, the grasp 504 may rotate from an extended position (e.g., the position illustrated in FIGS. 5A and 5B) to a collapsed position (e.g., the position illustrated in FIG. 5C) in a direction described as a down direction. The hinge 510 may define a clearance 516 that may facilitate the grasp 504 rotating a relatively short distance in an up direction opposite the down direction. Thus, for example, the clearance 516 may facilitate a limited degree of rotation in the up direction in response to a force encouraging the grasp 504 in the up direction. In some embodiments, the limited movement in the up direction may provide tactile feedback to a user handling the handle 500 to indicate that a force being exerted on the handle 500 is not sufficiently in line with the handle 500 for insertion or the like.

In some embodiments, the handle 500 may include a detent generally corresponding to the detent of the handle 200, the detent of the handle 300, and the detent of the handle 400. The detent of the handle 500 may include an extension 512, a protrusion 518, and a recess 524 defined by the base 502 and particularly by the position of the protrusion 518. The extension 512 may include a protrusion 520 and may define a recess 522 located adjacent the protrusion 520. The protrusion 520 may be sized and shaped to be located at least partially within the recess 524 while the handle 500 is in the extended position. The protrusion 518 may be located at least partially within the recess 522 and may encourage the protrusion 520 to remain within the recess 524 until the handle 500 is subjected to a detent-releasing force. In response to being subjected to a detent-releasing force, the protrusion 520 may exit the recess and the grasp 504 may enter a collapsed position.

What is claimed is:

1. A communication module handle comprising:
   a base configured to be located on a body of a communication module;
   a grasp;
   a hinge connecting the base and the grasp; and
   a detent configured to maintain a position of the grasp relative to the base in an extended position in which the base and the grasp are aligned and, in response to the detent being subjected to a detent-releasing force, to release the grasp from the extended position to a collapsed position in which the base and the grasp are not aligned, the grasp being rotatable relative to the base by way of the hinge in the collapsed position.

2. The communication module handle of claim 1, wherein the hinge includes a pin located at least partially within a first opening defined in the base and a second opening defined in the grasp.

3. The communication module handle of claim 1, wherein the hinge includes a flexible connector.

4. The communication module handle of claim 1, wherein the base includes a member and the grasp includes an extension positioned adjacent to the member.

5. The communication module handle of claim 4, wherein the detent includes a recess defined in the member and a protrusion defined on the extension, the protrusion configured to be located at least partially within the recess of the member while the grasp is in the extended position relative to the base.

6. The communication module handle of claim 1, wherein the base defines a recess and the grasp defines an extension configured to be located at least partially within the recess of the base while the grasp is in the extended position relative to the base.

7. The communication module handle of claim 6, wherein the detent includes an opening defined in the base and a protrusion located on the extension, the protrusion configured to be located, at least partially, within the opening while the grasp is in the extended position relative to the base.

8. The communication module handle of claim 7, wherein the protrusion includes a flange configured to be positioned, at least partially, within a rabbet defined in the base adjacent the opening while the grasp is in the extended position relative to the base, and the protrusion defines a channel in the protrusion.

9. The communication module handle of claim 1, wherein the base defines an opening through a width of the base, the opening open on a side of the base adjacent the grasp, and wherein the grasp includes an extension configured to be located, at least partially, within the opening while the grasp is in the extended position relative to the base.

10. The communication module handle of claim 9, wherein the extension includes a protrusion and the base defines a recess adjacent to the opening, and wherein the protrusion is configured to be located, at least partially, within the recess while the grasp is in the extended position relative to the base.

11. The communication module handle of claim 1, wherein the base defines a recess, and wherein the grasp includes an extension having a protrusion configured to be located at least partially within the recess of the base while the grasp is in the extended position relative to the base.

12. An optoelectronic communication module comprising:
    a body; and
    a handle including:
       a base configured to be located on the body;
       a grasp;
       a hinge connecting the base and the grasp; and
       a detent configured to maintain a position of the grasp relative to the base in an extended position in which the base and the grasp are aligned and, in response to the detent being subjected to a detent-releasing force, to release the grasp from the extended position to a collapsed position in which the base and the grasp are not aligned, the grasp being rotatable relative to the base by way of the hinge in the collapsed position.

13. The optoelectronic communication module of claim 12, wherein the hinge wherein the hinge includes a pin at least partially within a first opening defined in the base and a second opening defined in the grasp.

14. The optoelectronic communication module of claim 12, wherein the hinge includes a flexible connector.

15. The optoelectronic communication module of claim 12, wherein the base includes a member and the grasp includes an extension positioned adjacent to the member, and wherein the detent includes a recess defined in the member and a protrusion defined on the extension, the protrusion configured to be located at least partially within the recess of the member while the grasp is in the extended position relative to the base.

16. The optoelectronic communication module of claim 12, wherein the base defines a recess and the grasp defines an extension configured to be located at least partially within the recess of the base while the grasp is in the extended position relative to the base.

17. The optoelectronic communication module of claim 16, wherein the detent includes an opening defined in the base and a protrusion located on the extension, the protrusion configured to be located, at least partially, within the opening while the grasp is in the extended position relative to the base, and wherein the protrusion includes a flange configured to be positioned, at least partially, within a rabbet defined in the opening while the grasp is in the extended position relative to the base, and the protrusion defines a channel in the protrusion.

18. The optoelectronic communication module of claim 12, wherein the base defines an opening through a width of the base, the opening open on a side of the base adjacent the grasp, and wherein the grasp includes an extension configured to be located, at least partially, within the opening while the grasp is in the extended position relative to the base.

19. The optoelectronic communication module of claim 18, wherein the extension includes a protrusion and the base defines a recess adjacent to the opening, and wherein the protrusion is configured to be located, at least partially, within the recess while the grasp is in the extended position relative to the base.

20. The optoelectronic communication module of claim 12, wherein the base defines a recess, and wherein the grasp includes an extension having a protrusion configured to be located at least partially within the recess of the base while the grasp is in the extended position relative to the base.

* * * * *